(150.)

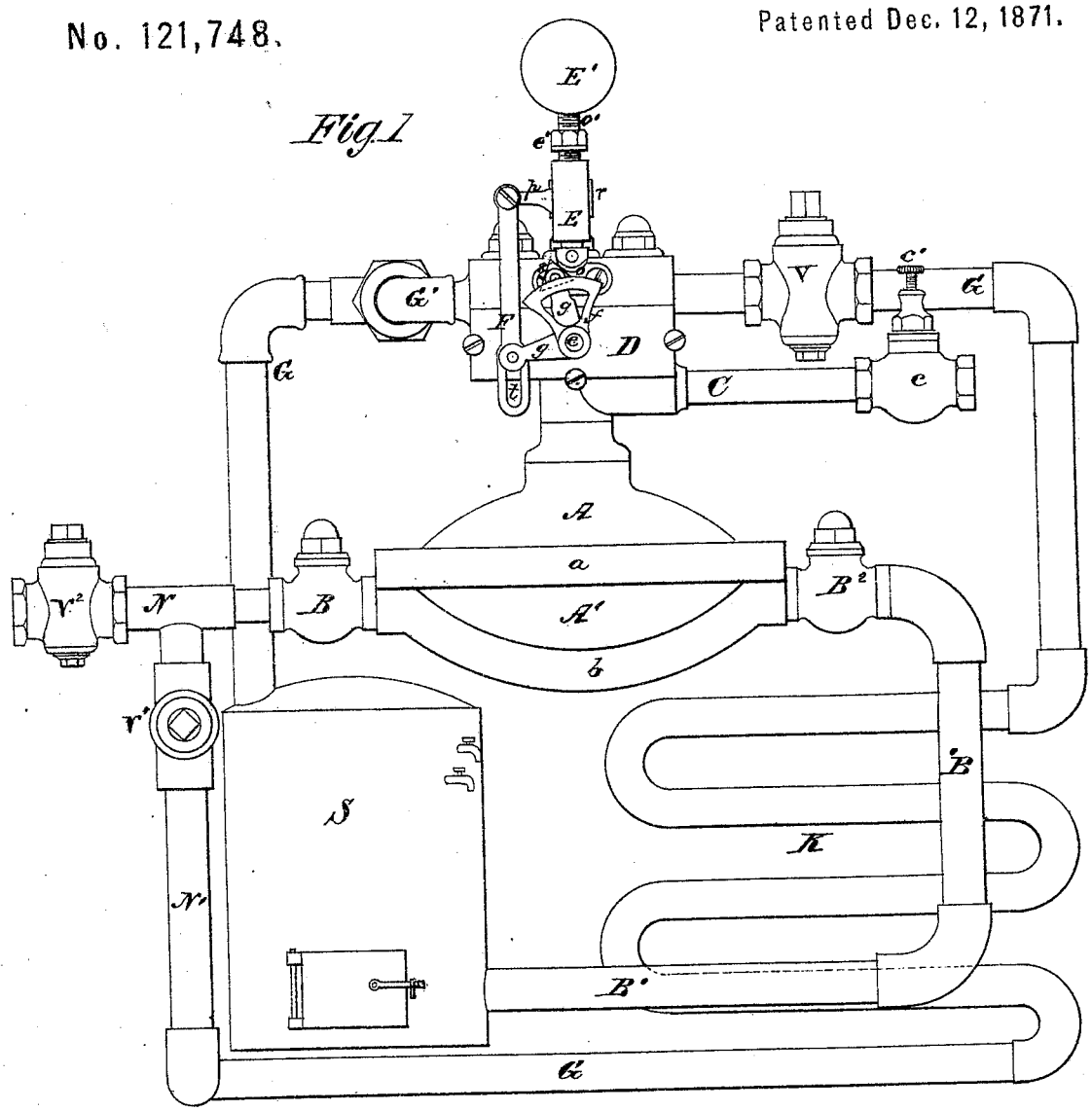

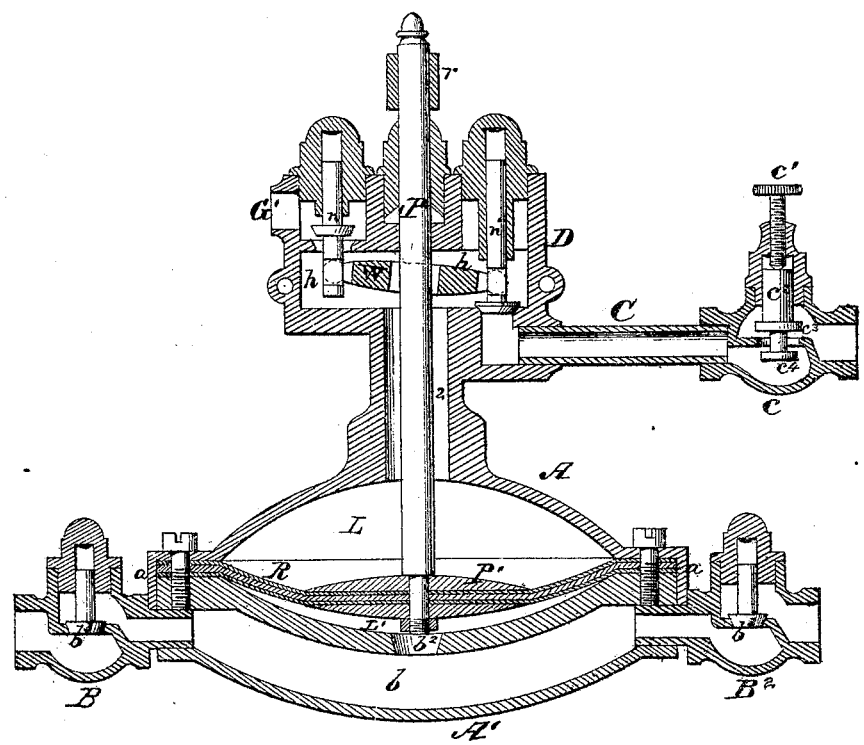

3 Sheets--Sheet 3.

JAMES H. BLESSING.

Improvement in Apparatus for Warming Buildings with Steam.

No. 121,748.

Patented Dec. 12, 1871.

121,748

UNITED STATES PATENT OFFICE.

JAMES H. BLESSING, OF ALBANY, NEW YORK, ASSIGNOR TO HIMSELF AND FREDERICK TOWNSEND, OF SAME PLACE.

IMPROVEMENT IN APPARATUS FOR WARMING BUILDINGS WITH STEAM.

Specification forming part of Letters Patent No. 121,748, dated December 12, 1871.

*To all whom it may concern:*

Be it known that I, JAMES H. BLESSING, of the city and county of Albany and State of New York, have invented certain Improvements in Apparatus for Warming Buildings and other Structures with Steam; and I do hereby declare that the following is a full, clear, and exact description thereof, reference being had to the accompanying drawing making part of this specification, in which—

Figure 4:
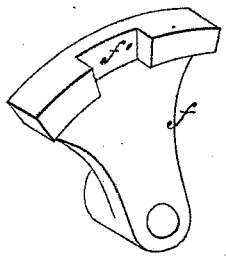
Figure 3:
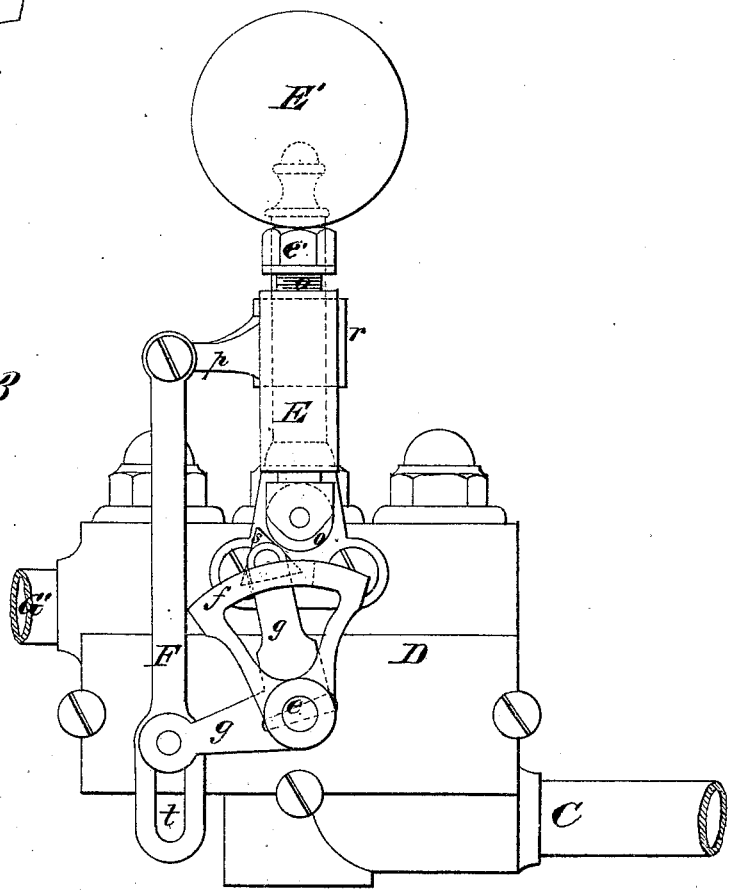

Figure 1, Plate 1, is a diagram illustrating the apparatus complete. Fig. 2, Plate 2, is a section taken diametrically through the steam-trap and its valve-boxes. Fig. 3, Plate 3, is a front view of the valve-box and tripping devices which are applied thereto. Fig. 4, Plate 3, is a perspective view of the oscillating sector of the tripping devices.

This invention relates to certain novel improvements which are applicable to apparatus designed for warming buildings with steam. The objects of the improvements are: First, to simplify the tripping devices for the inlet and exhaust-valves described in the schedule annexed to my Letters Patent of the United States dated on the 2d day of May, 1871, by the employment of a vertically-movable gravitating rod in combination with an oscillating angular lever, an oscillating segment, and a vertically-movable slotted tripping-rod, so constructed and connected to the diaphragm-rod that the rising-and-falling movements of this rod will actuate the inlet and exhaust-valves through which steam is allowed to enter the diaphragm-case, and its water of condensation is caused to escape therefrom, as will be hereinafter explained. Second, to combine with the exhaust-passage of the diaphragm-case an automatically-operating check-valve, which can be adjusted at will for regulating the exhaust and speed of the trap, as will be hereinafter explained. Third, to so construct the trap and its accessories that the same can be employed as a means for supplying the steam-boiler, when under pressure, with feed-water from an elevated reservoir, as will be hereinafter explained.

The following description of my invention will enable others skilled in the art to understand it.

In the accompanying drawing, Fig. 1, I have represented, in connection with the steam-trap, a steam-boiler, a heating-coil, and a system of conducting-pipes; but it is obvious that the proper relative proportions of these parts is not preserved. The steam-boiler S is of the well-known kind used in connection with warming apparatus. From the steam-space of this boiler a pipe, G, leads upward and communicates with the steam-heaters $k$, which are arranged in different parts of the building; also with a pipe, N', which communicates with a pipe, N, leading from an elevated reservoir of feed-water into one end of a passage, $b$, which communicates with the lower apartment L' of the steam-trap. The pipes G, N', and N are provided, respectively, with cut-off cocks V, $V^1$, and $V^2$, as shown in Fig. 1. Another pipe, B', forms a communication between the passage $b$ of the trap and the water-space of the steam-boiler; and still another pipe, C, leads out of the chamber $h$ of a valve-box, D, and is provided with an automatic check-valve for regulating the escape of steam, as will be hereinafter explained. The lower portion or case of the trap is preferably made of two concavo-convex sections, A A', flanged and bolted together with a flexible diaphragm, R, confined between them, as shown in Fig. 2. This diaphragm is composed of a circular sheet of highly-vulcanized rubber interposed between two pieces of strong cloth. It forms in the case two apartments, L L'—an upper apartment, L, and a lower one, L'—between which there is no communication whatever. The lower section A' of the diaphragm-case is constructed with a diametrical passage, $b$, which communicates centrally with the lower apartment L' through an opening, $b^2$, and which communicates at one end with inlet-pipe N and at its opposite end with outlet-pipe $B^2$. The upper section A of the diaphragm-case is constructed with a central contracted neck, which is suitably secured to the bottom of the valve-box D, and which affords a communication, 2, between the chamber L above the diaphragm R and the chamber $h$ in the box D, as shown in Fig. 2. The diaphragm R has a rod, P, connected centrally to it by means of plate P and a nut on the end of said rod. The rod P extends up through the passage 2 through the valve-box D and through a stuffing-box which is applied to the top of the valve-box; consequently, when the diaphragm rises and descends it will impart corresponding movements to the rod P. By means of a collar, $r$, a horizontal arm, $p$, is secured fast to that portion of the rod P which is exposed above the box D, and to the outer extremity of this arm the upper end of a rod, F, is pivoted, the lower end of which is slotted at *t*, as shown in Figs. 1 and 3. The oblong slot *t* through the lower end of the rod F receives through it a stud which is on one end of an angular lever, *g*, thus connecting rod F to this lever. The lever *g* is applied so as to oscillate loosely upon a horizontal stem, *e*, which is part of a rocking-lever, W, that trips the inlet and outlet-valves *n n'*, shown in Fig. 2. The opposite or upper arm or lever *g* plays in a notch, *f'*, which is made into the flanged portion of an oscillating segment *f*. This segment *f* is keyed on the stem *e* and oscillates this stem, together with the valve-lever W. The upper end of the last-named arm of lever *g* has a triangular anti-friction plate, *s*, pivoted to it, which impinges against an anti-friction wheel, *o*, on the lower end of a gravitating-rod, *o'*. The rod *o'* plays vertically through a tubular bracket, E, which is fixed to the valve-box D, and its axis coincides with a vertical plane intersecting the axis of the stem *e*. On the upper portion of the rod *o'* a weight, E', is applied so that it can be adjusted up and down to allow more or less of the rod *o'* to be exposed below the lower end of the bracket-tube E, as may be desired. The nut *e'*, which has a cushion on its lower end, serves as a jam-nut for the weight. The upper arm of lever *g* has considerable play in its slot or notch *f'* in segment *f*, and at the commencement of each up and down stroke of the diaphragm-rod P the slot *t* allows this rod to move some distance before the latter operates upon the lever *g*. The loaded rod *o'* is supported upon one or the other of the three sides of plate *s*, so as to throw the arm of lever *g*, carrying this plate, quickly past a vertical plane intersecting the axis of the stem *e*, whether the lever *g* be moved toward the right hand or the left.

It will be seen from the above description that when the diaphragm and its rod are forced upward and nearly reach the termination of this upstroke, the rod F, assisted by loaded rod *o'*, will move lever *g*, which in turn will move the segment *f* and cause lever W to shut the outlet-valve *n'* and open the inlet-valve *n*, thus cutting off the exhaust and allowing the pressure of steam from pipe G to act upon the upper side of diaphragm R and depress it, together with the rod P. When the diaphragm and its rod are pressed downward, just before the termination of this down-stroke the rod F strikes the lever *g*, and, with the assistance of the loaded lever *o'*, moves this lever to the position indicated in Figs. 1 and 3, and, by acting on the segment *f*, tilts lever W and closes valve *n* and opens valve *n'*, thus allowing of an exhaust through pipe C and the check-valve opening.

In order to regulate the exhaust through pipe C, I employ a double valve within the valve-box *c*. This device consists of two cylindrical valves, $c^3$ and $c^4$, applied to a vertically-movable stem, $c^2$, the ascent of which is regulated by a screw, $c^1$, applied above it. The valves are formed on the stem, and the upper valve is of such diameter as will cover the cylindrical opening through the partition in the valve-box *c*, while the lower valve $c^4$, is slightly smaller in diameter than said opening, as shown in Fig. 2. This check-valve in the exhaust-pipe operates as follows: At the moment the diaphragm R commences the upper stroke the exhaust-valve *n'* is opened and the exhaust-steam on its way to the atmosphere, passing through the check-valve opening, strikes the upper valve $c^3$ and lifts it from its seat, carrying with it the lower valve $c^4$ until the stem $c^2$ strikes the set-screw $c^1$, which latter is so adjusted as to prevent the lower valve from entering the cylindrical passage through the partition, leaving thereby a space for the passage of the exhaust steam. When the diaphragm commences its down-stroke the exhaust-valve *n'* closes and the check-valves $c^3 c^4$ fall, by their own weight, until arrested by the upper valve striking its seat, thereby insuring the clearance of all sediment out of the space through which passes the exhaust steam. After the check-valves are adjusted to the proper working of the trap they preserve this adjustment and operate automatically to regulate the speed of the trap.

When it is desired to supply the steam-boiler with feed-water from a reservoir with which the pipe N communicates, the coil-heater is cut off from the trap by closing the cock V and the cock $V^1$ in the drip-leg N'. The cock $V^2$ in the feed-pipe N is then opened, which establishes a communication between the lower apartment L' of the trap-case and the reservoir of water above referred to. The steam communication between the upper compartment L of the trap, valves, and boiler is precisely the same as before; but instead of allowing the drip to flow into the boiler the feed-water only will flow therein through pipe $B^1$, entering the trap through a check-valve, $b^3$, in a valve-box, B, and escaping through check-valve $b^1$ in a valve-box, $B^2$.

It is important that the reservoir for the supply of feed-water should be above the level of the trap. Thirty inches above the level of the trap has been found to answer a good purpose for the elevation of the reservoir, though it may be placed much higher, or even lower than this. The trap itself should be arranged above the high-water level in the boiler, so that the drip-water or water of condensation will flow back into the boiler by its own gravity when the inlet-valve is opened and the exhaust-valve is shut, and an equilibrium of pressure between the upper and lower sides of the diaphragm is established.

Having described my invention, what I claim as new is—

1. The tripping-lever *g* and segment *f* applied on the stem of valve-lever W, in combination with the gravitating-rod *o'*, the slotted rod F, and the diaphragm-rod P, substantially as described.

2. The segment *f* fixed to the stem *e* and notched at *f'* to receive one arm of an angular lever, *g*, which is applied loosely on said stem *e*, substantially as and for the purposes described.

3. The combination of a check-valve with the exhaust-valve passage of the valve-box D, substantially as and for the purposes described.

4. The valve-lever W and its stem *e*, in combination with inlet and outlet-valves *n n'* in valve-box D, a tripping device, and a vertically-movable diaphragm-rod, P, all substantially as described.

5. The passages $b\ b^2$ constructed in the section A′ of the diaphragm-case, substantially as and for the purposes described.

6. The inlet and outlet check-valves $b^1\ b^3$, in combination with the chamber L′ of the diaphragm-case A A′, substantially as described.

JAMES H. BLESSING.

Witnesses:
  A. P. STUART,
  PETER J. CALLEN.

(147)